United States Patent
Sato

(10) Patent No.: US 6,553,015 B1
(45) Date of Patent: Apr. 22, 2003

(54) HIGH SPEED SWITCHING OF COMMUNICATIONS LINKS WITHOUT INTERRUPTING ATM CELL TRAFFIC

(75) Inventor: Hiroyuki Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/315,346

(22) Filed: May 20, 1999

(30) Foreign Application Priority Data

May 20, 1998 (JP) .......................................... 10-153712

(51) Int. Cl.[7] ................................................ H04B 7/00
(52) U.S. Cl. ...................................... 370/331; 455/437
(58) Field of Search ................................ 455/436, 437, 455/438, 439, 442; 370/331, 332, 333, 334

(56) References Cited

U.S. PATENT DOCUMENTS

| | | | | |
|---|---|---|---|---|
| 5,434,854 A | * | 7/1995 | Focarile et al. | ............ 370/60.1 |
| 5,940,371 A | * | 8/1999 | Mitts et al. | ................. 370/236 |
| 5,940,381 A | * | 8/1999 | Freeburg et al. | ............ 370/331 |
| 5,974,036 A | * | 10/1999 | Acharya et al. | ............ 370/331 |

FOREIGN PATENT DOCUMENTS

| | | |
|---|---|---|
| JP | 6-98370 | 4/1994 |
| JP | 8-46643 | 2/1996 |
| JP | 9-154178 | 6/1997 |
| JP | 9-261713 | 10/1997 |
| JP | 9-321737 | 11/1997 |

* cited by examiner

*Primary Examiner*—Alpus H. Hsu
*Assistant Examiner*—Thien Tran
(74) *Attorney, Agent, or Firm*—Sughrue Mion, PLLC

(57) ABSTRACT

In a mobile ATM communications network, upstream ATM cells and downstream ATM cells are transmitted between a mobile site and a fixed site over a first communication link and a handoff request message is sent from the mobile site to the fixed site when the first communication link is likely to become unavailable. In response, the upstream ATM cells are held in a first buffer and the location of a cell that is to be transmitted first when transmission of upstream cells is resumed is determined and an address pointer indicating that location is stored in a first memory. An end-of-stream OAM cell is sent from the mobile site to the fixed site over the first communication link, so that in the fixed site, the downstream ATM cells are held in a second buffer and the location of a cell within the second buffer which is to be transmitted first when transmission of downstream cells is resumed is determined and an address pointer indicating that location is stored in a second memory. A second communication link is then established between the mobile and fixed sites, and transmission of upstream ATM cells is resumed, starting with a location of the first buffer specified by the address pointer in the first memory and transmission of downstream ATM cells is resumed, starting with a location of the second buffer specified by the address pointer in the second memory.

22 Claims, 3 Drawing Sheets

HIGH SPEED SWITCHING OF COMMUNICATIONS LINKS WITHOUT INTERRUPTING ATM CELL TRAFFIC

BACKGROUND OF THE INVENTION

1. Field of the Invention

The present invention relates generally to ATM (asynchronous transfer mode) communications network, and more specifically to a method of switching communication links without interrupting ATM cell traffic in order to avoid cell loss or duplication of cells. The present invention is particularly suitable for mobile ATM communications networks.

2. Description of the Related Art

In mobile communication systems, digital speech signals of a mobile station are tolerant of short interruptions of a communication link. Such interruptions usually occur as a result of a handoff when the mobile station moves around and crosses the boundary between adjoining cell-site areas.

In the case of conventional ATM communication systems, a handoff protocol is activated when an end-to-end connection is established. However, the protocol takes no account of problems associated with possible switchover of connections during communication. In a proposed wireless ATM system, user data and signaling messages are separately buffered and processed according to individual handoff protocols.

In broadband wireless ATM communications networks, missing or duplication of an ATM cell is detrimental to the quality of end-to-end computer data communication. However, the techniques currently available for use in the broadband ATM network cannot avoid missing and duplication of ATM cells when a handoff is encountered. In addition, the switching speed is low because of the separated buffering of user data and signaling messages.

SUMMARY OF THE INVENTION

It is therefore an object of the present invention to provide high speed switching of communication links without interrupting ATM cell traffic.

According to one aspect of the present invention, there is provided a switching method for an ATM communications network, wherein upstream ATM cells and downstream ATM cells are transmitted between a first site and a second site over a first communication link and a request message is sent from the first site to the second site when the first communication link is likely to become unavailable. The method comprises the steps of (a) holding the upstream ATM cells in a first buffer immediately following the transmission of the request message and determining the location of one of the upstream cells within the first buffer which is to be transmitted first when transmission of upstream cells is resumed and storing an address pointer indicating the location in a first address memory, (b) transmitting an end-of-stream OAM (operations, administration and maintenance) cell between the sites over the first communication link, (c) holding the downstream ATM cells in a second buffer in response to the end-of-stream OAM cell and determining the location of one of the downstream cells within the second buffer which is to be transmitted first when transmission of downstream cells is resumed and storing an address pointer indicating the location in a second address memory, (d) establishing a second communication link between the first and second sites, and (e) resuming transmission of upstream ATM cells from the first site over the second communication link, starting with a location of the first buffer specified by the address pointer in the first address memory and resuming transmission of downstream ATM cells from the second site over the second communication link, starting with a location of the second buffer specified by the address pointer in the second address memory.

According to a second aspect, the present invention provides a handoff method for a mobile ATM communications network, wherein upstream ATM cells and downstream ATM cells are transmitted between a mobile site and a fixed site over a first communication link and a handoff request message is sent from the mobile site to the fixed site when the first communication link is likely to become unavailable. The handoff method comprises the steps of (a) holding the upstream ATM cells in a mobile-site buffer immediately following the transmission of the handoff request message and determining the location of one of the upstream cells within the mobile-site buffer which is to be transmitted first when transmission of upstream cells is resumed and storing an address pointer indicating the location in a mobile-site memory, (b) transmitting an end-of-stream OAM cell from the mobile site to the fixed site over the first communication link, (c) holding the downstream ATM cells in a fixed-site buffer in response to the end-of-stream OAM cell and determining the location of one of the downstream cells within the fixed-site buffer which is to be transmitted first when transmission of downstream cells is resumed and storing an address pointer indicating the location in a fixed-site memory, (d) establishing a second communication link between the mobile site and the fixed site, and (e) resuming transmission of upstream ATM cells from the mobile site, starting with a location of the mobile-site buffer specified by the address pointer in the mobile-site memory and resuming transmission of downstream ATM cells from the fixed site, starting with a location of the fixed-site buffer specified by the address pointer in the fixed-site memory.

According to a third aspect, the present invention provides an end user system for an ATM communications network, comprising an interface for establishing a wireless link to the network, a transmit buffer for transmitting upstream ATM cells to the network via the interface, monitor circuitry for monitoring the wireless link and transmitting a request message to the network when the link is likely to become unavailable for informing that the end user system is establishing a new wireless link, an address memory, and a controller for (a) holding the upstream ATM cells in the transmit buffer immediately following the transmission of the request message, (b) determining the location of one of the upstream cells within the transmit buffer which is to be transmitted first when transmission of upstream cells is resumed, (c) storing an address pointer indicating the location in the address memory, (d) transmitting an end-of-stream OAM (operations, administration and maintenance) cell to the network before the new link is established, and (e) resuming transmission of upstream ATM cells when the new wireless link is established, starting with a location of the transmit buffer specified by the address pointer in the first address memory.

According to a fourth aspect, the present invention provides a network apparatus for an ATM communications network, comprising an ATM switching system for establishing a communication link to an end user system via a first base station, a transmit buffer for transmitting downstream ATM cells to the end user system via the ATM switching system, a receive buffer for receiving upstream ATM cells from the end user system via the ATM switching system, a processor for receiving a request message from the end user system when the wireless link is likely to become unavailable and determining a new communication link, an address memory, and a controller for (a) holding the downstream ATM cells in the transmit buffer in response to an end-of-stream OAM (operations, administration and maintenance) cell from the end user system, (b) determining the location of one of the downstream cells within the transmit buffer which is to be transmitted first when transmission of downstream cells is resumed, (c) storing an address pointer indicating the location into the address memory, (d) controlling the ATM switching system to establish the new communication link via a second base station, (e) resuming transmission of downstream ATM cells via the new communication link, starting with a location of the transmit buffer specified by the address pointer in the address memory, and (f) receiving a start-of-stream OAM cell from the end user system via the new wireless link and resuming reception of upstream ATM cells from the end user system by storing received cells in locations of the receive buffer corresponding to the start-of-stream OAM cell.

According to a further aspect, the present invention provides a mobile ATM communications network comprising a network apparatus and a user end system. The network apparatus comprises an ATM switching system for establishing a communication link to an end user system via a first base station, a network transmit buffer for forwarding downstream ATM cells to the ATM switching system, a network receive buffer for receiving upstream ATM cells from the ATM switching system, a processor connected to the ATM switching system for receiving a request message from the end user system and determining a new communication link to the end user system via a second base station, a network address memory, and a controller connected to the ATM switching system for (a) holding the downstream ATM cells in the network transmit buffer in response to an end-of-stream OAM (operations, administration and maintenance) cell from the end user system, (b) determining the location of one of the downstream cells within the network transmit buffer which is to be transmitted first when transmission of downstream cells is resumed, (c) storing an address pointer indicating the location into the address memory, (d) controlling the ATM switching system to establish the new communication link, (e) resuming transmission of downstream ATM cells via the new communication link, starting with a location of the network transmit buffer specified by the address pointer in the network address memory, and (f) receiving a start-of-stream OAM cell from the end user system via the new wireless link and resuming reception of upstream ATM cells from the end user system by storing received cells in locations of the network receive buffer corresponding to the start-of-stream OAM cell. The end user system comprises an interface for selectively establishing a wireless link to one of the first and second base stations, a user transmit buffer for transmitting the upstream ATM cells to the network apparatus via the interface, monitor circuitry for monitoring the wireless link to the first base station and transmitting the request message to the network apparatus for informing that the end user system is establishing a new wireless link to the second base station when the monitored wireless link is likely to become unavailable, a user address memory, and a controller for (a) holding the upstream ATM cells in the user transmit buffer immediately following the transmission of the request message, (b) determining the location of one of the upstream cells within the user transmit buffer which is to be transmitted first when transmission of upstream cells is resumed, (c) storing an address pointer indicating the location in the user address memory, (d) transmitting an end-of-stream OAM cell to the network apparatus before the new wireless link is established, causing the interface to establish the new wireless link, and (e) resuming transmission of upstream ATM cells when the new wireless link is established, starting with a location of the transmit buffer specified by the address pointer in the first address memory.

BRIEF DESCRIPTION OF THE DRAWINGS

The present invention will be described in further detail with reference to the accompanying drawings, in which.

DETAILED DESCRIPTION

Figure 1:
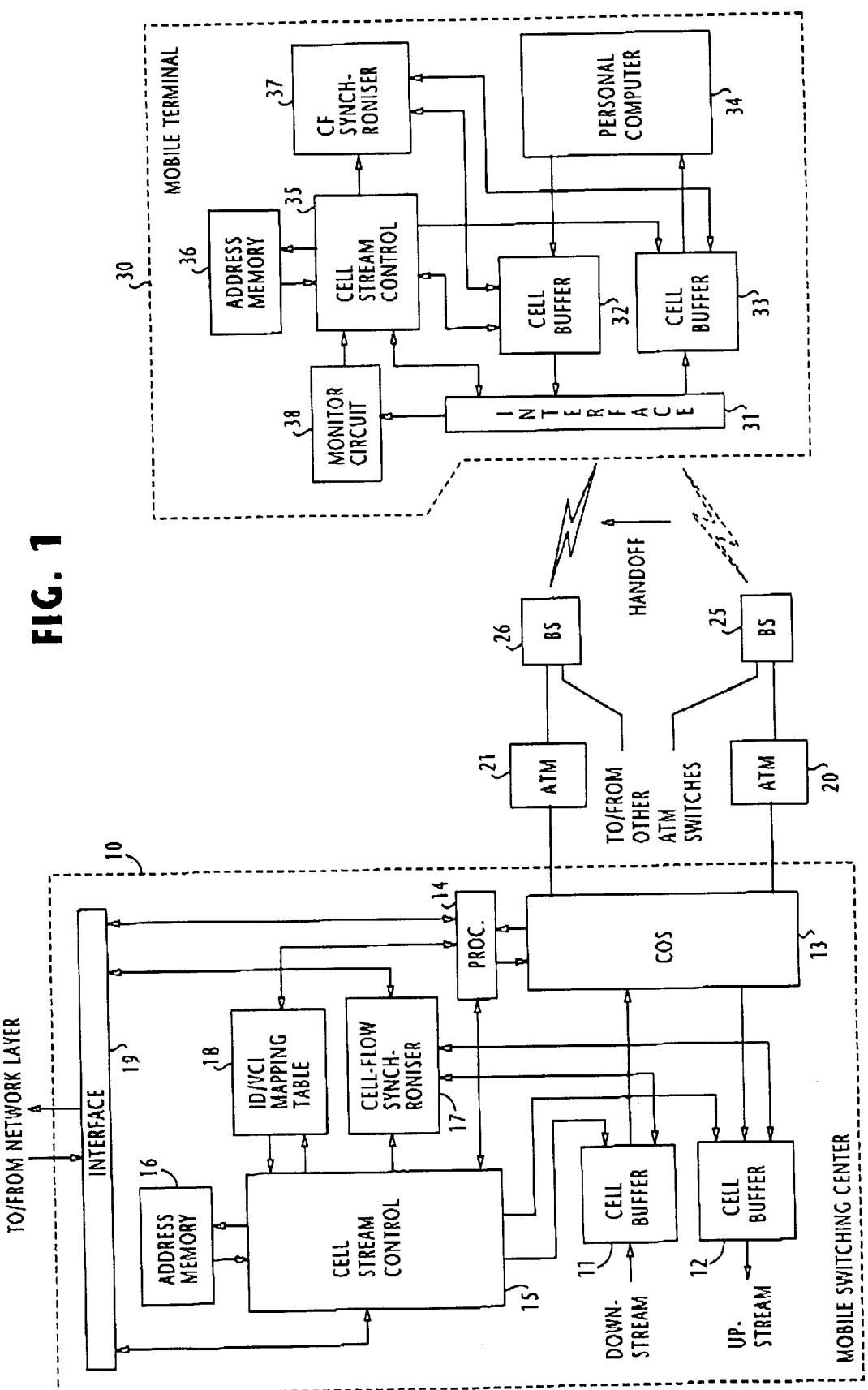
FIG. 1 is a block diagram of a mobile ATM communication system of the present invention.

In FIG. 1, there is shown a mobile ATM communications network according to the present invention. The mobile network comprises an ATM mobile switching center 10 having an ATM crossover switch (COS) 13 that is connected to a fixed land-line network (not shown), a plurality of ATM switches, a plurality of cell-site base stations and mobile terminals. For simplicity, only two ATM switches 20, 21 and two cell-site base stations 25, 26 and one mobile terminal 30 are illustrated. ATM switches 20 and 21 are connected to the crossover switch 13 for respectively accommodating the base stations 25 and 26. Each of the base stations 25 and 26 may have access to one or more ATM switches that are accommodated by the same crossover switch 13.

Mobile switching center 10 has a transmit cell buffer 11 for buffering network's downstream traffic and a receive cell buffer 12 for buffering upstream traffic of the mobile terminal. Crossover switch 13 performs the self-routing of 53-byte ATM cells supplied from the transmit cell buffer 11 to one of the base stations 25, 26 via one of the ATM switches 20, 21 and the self-routing of mobile-transmitted ATM cells from one of the ATM switches 20, 21 to the receive cell buffer 12. While only two cell buffers are illustrated, they are provided in number corresponding to traffic needs.

Crossover switch 13 has a number of routing tables, not shown, which are respectively associated with transmit cell buffers. For routing incoming cells within the switch 13, their cell header is updated with routing information contained in the associated routing table, which is in turn updated by a processor 14 according to the internal states of the switch 13 in a manner known in the art. Similar to crossover switch 13, self-routing operations occur in the ATM switches 20 and 21 for both downstream and upstream cells.

According to the present invention, a cell stream controller 15 and an address memory 16 are provided for controlling the network's cell buffers 11 and 12 during a handoff operation. In addition, a mapping table 18 is connected between the cell stream controller 15 and the processor 14 for mapping the identifier of each communicating mobile terminal to one or more VCIs/VPIs that are assigned to virtual channels established by signaling cells and used by the crossover switch 13 for routing data (message) cells. These VCIs/VPIs may differ from the values actually assigned to the mobile terminal for a communication path between it and the base stations.

In order to ensure cell sequence integrity, a cell-flow synchronizer 17 is used to establish cell-flow synchronization between the network and the communicating mobile terminal after communication is resumed following a handoff procedure. Without this synchronization procedure, discontinuity can occur between data streams before and after a handoff due to possible errors in address pointer.

Processor 14 is also connected to a C-plane's layer-3 signaling processor of the fixed land-line network via an interface 19 for exchanging various signaling messages necessary for establishing connections between the base stations and mobile terminals in response to call requests and handoff requests, Cell stream controller 15 is also connected to the network layer processor via the interface 19 to receive handoff command message. Processor 14 has an ATM U-plane signaling functions of the crossover switch 13 for coordinating with the C-plane signaling processor of the network.

When the synchronizer 17 is informed by the cell stream controller 15 that a handoff complete message has been transmitted to the mobile terminal, it exchanges information with the layer-3 signaling processor of the network to send a cell-flow synchronization request message to the mobile terminal to initiate a cell sequence control by the in-band signaling method. When cell-flow synchronization is established, the synchronizer 17 communicates this fact to the layer-3 signaling processor via the interface 19.

Mobile terminal 30 has an air interface 31 for interfacing the mobile terminal to one of the base stations. Transmit and receive cell buffers 32 and 33 are connected to the air interface 31 for buffering ATM cells generated in a personal computer 34 such as notebook computer or laptop computer. A cell stream controller 35 and an address memory 36 are provided for controlling the cell buffers 32, 33 before and after a handoff. Controller 35 is associated with the interface 31 to exchange OAM (operations, administration and maintenance) cells with the network.

A cell-flow synchroniser 37 is associated with the buffers 32, 33. Synchroniser 37 is enabled when a handoff procedure is completed to co-operate with the network-side synchroniser 17 to establish cell-flow synchronism so that cell sequence integrity is maintained.

A monitor circuit 38 is connected to the air interface 31. During communication, it constantly monitors the strength of signals from surrounding base stations and determines if the mobile terminal is crossing the boundary between the cell-site areas of base stations 25 and 26. If so, it informs the cell stream controller 35 that the mobile terminal has crossed a cell boundary and an action has to be taken to initiate a handoff procedure.

When the mobile terminal 30 establishes a communication with the network, a virtual path identified by a VPI (virtual path identifier) is assigned to the mobile terminal and a plurality of virtual channels, respectively identified by VCIs (virtual channel identifiers) are bundled on the assigned virtual path and a wireless link is established between a base station and the mobile terminal. When the level of the communicating signal at the mobile terminal falls below a specified level and the mobile is receiving a strong signal from another base station, it sends a handoff request message to the current base station. The request message is transmitted to the network where a decision is made on an appropriate route and an appropriate ATM switch that satisfy the QoS (quality-of-service) parameters of the mobile terminal. When the cell stream controller 15 receives a handoff command message from the network layer, it consults with the mapping table 18 and selects a new virtual path through the selected ATM switch to the new base station and commands the crossover switch 13 to establish a connection via the selected ATM switch and the new base station.

The handoff operations of mobile's cell stream controller 35 and 18 network cell stream controller 15 will be described with reference to 19 flowcharts of FIG. 2, respectively, with the aid of a sequence 20 diagram shown in FIG. 3.

Assume that the mobile terminal 30 is initially in communication with the network via ATM switch 20 and base station 25. During this communication, the mobile's upstream data cells are forwarded from the transmit cell buffer 32 and sent via base station 25 to the network's receive cell buffer 12 as indicated by line 40 in FIG. 3 and the network's downstream data cells are forwarded from the transmit cell buffer 11 to the mobile's receive cell buffer 33 via base station 25 as indicated by line 41.

If, at the mobile terminal 30, the signal from base station 25 falls below a critical value and the strength of a signal from base station 26 exceeds a predefined decision threshold, the monitor circuit 38 determines that its own mobile terminal has entered the cell-site area of base station 21 and supplies an output signal to the cell stream controller 35 (step 201).

At step 202, the cell stream controller 35 responds to this signal by sending a handoff request message (indicated by line 42 in FIG. 3) to the base station 25. This handoff request message is forwarded through ATM switch 20, COS switch 13, processor 14 and interface 19 and applied to the layer-3 signaling processor of the land-line network. In response, the land-line network determines a new ATM switch that satisfies the QoS parameters of the mobile terminal 30.

At step 203, the mobile's cell stream controller 35 commands the transmit cell buffer 32 to stop the upstream transmission of user cells of all virtual channels by holding them in their current address locations.

At step 204, the address pointer of a cell to be sent first following the handoff is determined and stored into the address memory 36.

At step 205, an EOS (end-of-stream) OAM (operations, administration and maintenance) cell is sent to the network via base station 25, ATM switch 20, COS switch 13 and processor 14 to the cell stream controller 15 (as indicated by line 43). This OAM cell contains the mobile's identification number (MT-ID).

Figure 2:
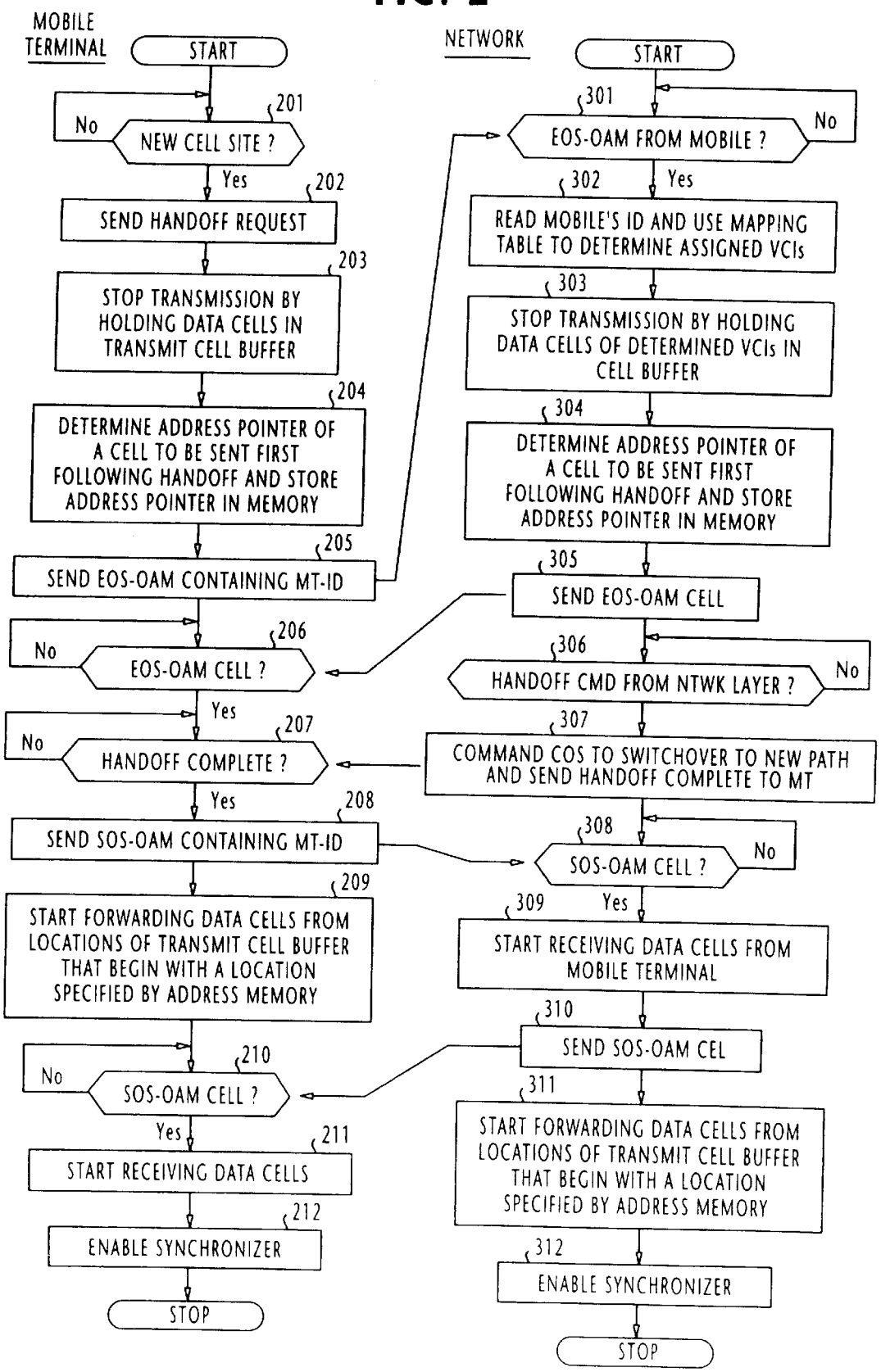
FIG. 2 is a flowchart of the operation of a mobile and network cell stream controller according to the present invention.

In FIG. 2, the network cell stream controller 15 receives the EOS-20OAM cell at step 301 to recognize that an upstream transmission has ceased, and proceeds to step 302 to read the mobile's identification number contained in the cell and uses the ID/NCI mapping table 18 to determine the VCIs currently assigned to the mobile terminal.

At step 303, the downstream transmission of all cells of the VCIs of the mobile terminal 30 is stopped and all cells are held in the transmit cell buffer 11.

At step 304, the network's cell stream controller 15 determines the address pointer of a cell to be sent first when the downstream transmission is resumed and stores it into the address memory 16.

Figure 3:
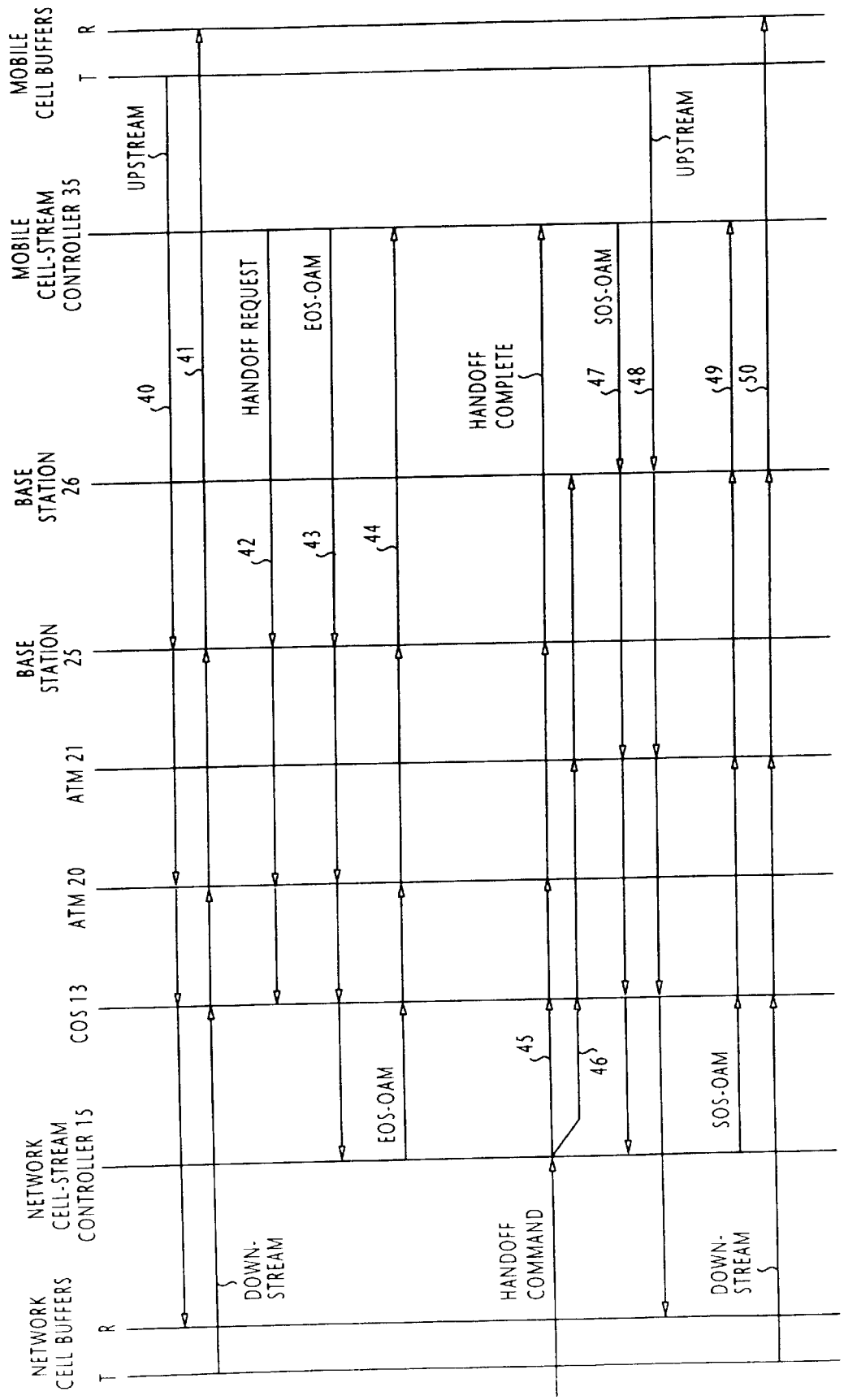
FIG. 3 is a sequence diagram for illustrating data flow between the 14 ATM network and the mobile terminal.

At step 305, an EOS-OAM cell is then formulated by the cell stream controller 15 and transmitted to the mobile terminal 30 via COS switch 13, ATM switch 20 and base station 20, as indicated by line 44 in FIG. 3. At step 206 in FIG. 2, the mobile terminal 30 receives this network-transmitted EOS-OAM cell and recognizes that the network's downstream transmission is stopped and proceeds to step 207 to check for the reception of a handoff complete message which will be transmitted from the network.

At step 306 in FIG. 2, the network cell stream controller 15 checks to see if a handoff command message is received from the interface 19. This handoff command message indicates a new ATM switch.

If the decision is affirmative at step 306, flow proceeds to step 307 to command the COS switch 13 to establish a new path to the selected new ATM switch. If ATM switch 21 is the one selected by the land-line network, the new path is established via the ATM switch 21 and base station 26 to the mobile terminal 30. Following the establishment of a new path to the mobile terminal, the cell stream controller 15 sends a handoff command message to the base stations 25, 26 and a handoff complete message to mobile terminal 30 via base station 25 (as indicated by lines 45, 46).

Thus, the mobile terminal responds to the handoff complete message by switching over to base station 26 (step 207).

At step 208, the mobile cell stream controller 35 formulates and transmits an SOS (start-of-stream) OAM cell containing the mobile's identification number (MT-ID) to the network via the new base station 26 (as indicated by line 47), followed by upstream transmission of data cells (as indicated by line 48) read from locations of the transmit cell buffer 32 that begin with the one specified by the address pointer stored in the address memory 36 and forwarded to the network (step 209).

The mobile-transmitted SOS-OAM cell is received by the cell stream controller 15, at step 308. In response, the cell stream controller 15 reads the mobile's identifier contained in the SOS-OAM cell and identifies the mobile's VCIs from the mapping table 18 and specifies the locations of the receive cell buffer 12 to start receiving the mobile-transmitted data cells via base station 26 for temporary storage in the specified locations (step 309). If an error is detected in a received cell, a retransmission procedure will be activated to replace it with a retransmitted copy. At step 310, the network cell stream controller 15 formulates and transmits an SOS-OAM cell to the mobile terminal via base station 26 (as indicated by line 49), followed by downstream transmission of data cells (as indicated by line 50) forwarded from locations of the transmit cell buffer 11 that begin with a location specified by the address pointer stored in the address memory 16 corresponding to the VCIs assigned to mobile terminal 30 (step 311).

At step 312, the controller 15 enables the cell-flow synchroniser to establish a cell-flow synchronism to maintain cell sequence integrity.

At the mobile terminal, program execution proceeds to step 210 to check for the reception of the network-transmitted SOS-OAM cell to start receiving downstream data cells (step 211). At step 212, the cell-flow synchroniser 37 is enabled to co-operate with the network-side synchroniser 17 to check for the serial number of cells to maintain cell sequence integrity.

It is seen that the mobile terminal suffers from no lost cell or no duplicated cells even if it encounters a handoff.

In addition, since the OAM cell and the user data are buffered on the same virtual path, they can be processed on the ATM layer in a short period of time. Since user data of a group of virtual channels are processed as a single data item during a handoff operation, the handoff procedure of the present invention can support a mobile terminal that is simultaneously establishing a number of ATM connections.

What is claimed is:

1. A switching method for an ATM communications network, wherein upstream ATM cells and downstream ATM cells are transmitted between a first site and a second site over a first communication link and a request message is sent from the first site to the second site when the first communication link is likely to become unavailable, the method comprising the steps of:
   a) holding the upstream ATM cells in a first buffer located in said first site immediately following the transmission of said request message and determining the location of one of the upstream cells within said first buffer which is to be transmitted first when transmission of upstream cells is resumed and storing an address pointer indicating said location in a first address memory;
   b) transmitting an end-of-stream OAM (operations, administration and maintenance) cell from said first site to said second site over the first communication link;
   c) holding the downstream ATM cells in a second buffer located in said second site in response to the end-of-stream OAM cell and determining the location of one of the downstream cells within said second buffer which is to be transmitted first when transmission of downstream cells is resumed and storing an address pointer indicating said location into a second address memory;
   d) establishing a second communication link between said first and second sites; and
   e) resuming transmission of upstream ATM cells from the first site over the second communication link, starting with a location of said first buffer specified by the address pointer in said first address memory and resuming transmission of downstream ATM cells from the second site over the second communication link, starting with a location of said second buffer specified by the address pointer in said second address memory.

2. The switching method of claim 1, wherein the second communication link satisfies a quality-of-service parameter of said first site.

3. The switching method of claim 1, wherein step (e) comprises the step of transmitting a start-of-stream OAM cell from the first site to the second site over said second communication link, informing the second site that the transmission of ATM cells from the first site is resumed.

4. The switching method of claim 1, wherein step (c) comprises the step of transmitting a second end-of-stream OAM cell from the second site to the first site over the first communication path in response to the first end-of-stream OAM cell, indicating that the transmission of the ATM cells from the second site is interrupted.

5. The switching method of claim 1, wherein said stream of ATM cells belongs to a group of virtual channels respectively identified by virtual channel identifiers and bundled on a single virtual path identified by a virtual path identifier.

6. The switching method of claim 1, further comprising the step of establishing cell-flow synchronism between said first and second sites over said second communication link.

7. The switching method of claim 1, wherein said end-of-stream OAM cell contains identification of the first site, and wherein step (c) comprises:
   determining virtual channel identifiers corresponding to said identification; and
   holding said downstream ATM cells in locations of said second buffer corresponding to said virtual channel identifiers.

8. A handoff method for a mobile ATM communications network, wherein upstream ATM cells and downstream ATM cells are transmitted between a mobile site and a mobile switching center over a first communication link and a handoff request message is sent from the mobile site to the mobile switching center when the first communication link is likely to become unavailable, the method comprising the steps of:

a) holding the upstream ATM cells in a first buffer located in said mobile site immediately following the transmission of said handoff request message and determining the location of one of the upstream cells within said first buffer which is to be transmitted first when transmission of upstream cells is resumed and storing an address pointer indicating said location into a first address memory;

b) transmitting an end-of-stream OAM (operations, administration and maintenance) cell from the mobile site to the mobile switching center over the first communication link;

c) holding the downstream ATM cells in a second buffer located in said mobile switching center in response to the end-of-stream OAM cell and determining the location of one of the downstream cells within said second buffer which is to be transmitted first when transmission of downstream cells is resumed and storing an address pointer indicating said location into a second address memory;

d) establishing a second communication link between said mobile site and said mobile switching center; and e) resuming transmission of upstream ATM cells from said mobile site, starting with a location of said first buffer specified by the address pointer in said first address memory and resuming transmission of downstream ATM cells from said mobile switching center, starting with a location of said second buffer specified by the address pointer in said second address memory.

9. The handoff method of claim 8, wherein a first segment of said second communication link is determined to be available between said mobile site and the mobile switching center when said first communication link is likely to become unavailable, wherein step (d) comprises determining a second, remainder segment of said second communication link, said second segment satisfying a quality-of-service parameter of said mobile site.

10. The handoff method of claim 8, wherein step (e) further comprises the steps of:

transmitting a start-of-stream OAM cell from the mobile site to the mobile switching center over said second communication link; and resuming reception of upstream ATM cells from the mobile site by storing received cells in locations of a receive buffer corresponding to the start-of-stream OAM cell.

11. The handoff method of claim 8, wherein said upstream ATM cells belongs to a group of virtual channels respectively identified by virtual channel identifiers and bundled on a single virtual path identified by a virtual path identifier.

12. The handoff method of claim 8, further comprising the step of establishing cell-flow synchronism between said mobile site and said mobile switching center over said second communication link.

13. The handoff method of claim 8, wherein said end-of-stream OAM cell contains identification of the mobile site, and wherein step (c) comprises:

determining virtual channel identifiers corresponding to said identification; and holding said downstream ATM cells in locations of said second buffer corresponding to said virtual channel identifiers.

14. An end user system for an ATM communications network, comprising:

an interface for establishing a wireless link to the network;

a transmit buffer for transmitting upstream ATM cells to the network via the interface;

a receive buffer for receiving downstream ATM cells from the network via the interface;

monitor circuitry for monitoring said wireless link and transmitting a request message to said network when the link is likely to become unavailable for informing that the end user system is establishing a new wireless link;

an address memory; and a controller for (a) holding the upstream ATM cells in said transmit buffer immediately following the transmission of said request message, (b) determining the location of one of the upstream cells within said transmit buffer which is to be transmitted first when transmission of upstream cells is resumed, (c) storing an address pointer indicating said location in said address memory, (d) transmitting an end-of-stream OAM (operations, administration and maintenance) cell to the network before said new link is established, and (e) resuming transmission of upstream ATM cells when said new wireless link is established, starting with a location of said transmit buffer specified by the address pointer in said address memory.

15. The end user system of claim 14, wherein said controller is arranged to:

respond to a start-of-stream OAM cell from said network via said new wireless link for receiving said downstream ATM cells and storing the received cells into said receive buffer; and transmit a start-of-stream OAM cell to the network via the new wireless link to inform the network that the transmission of upstream ATM cells from said user end system is resumed.

16. The end user system of claim 14, further comprising a cell-flow synchroniser for establishing cell-flow synchronism with said network via said new wireless link to maintain cell sequence integrity.

17. A communications network comprising:

an end user system;

first and second base stations for establishing a wireless link to said end user system;

an ATM switching system connected to said first and second base stations for establishing a communication link to said end user system via said first base station; and a mobile switching center connected to said ATM switching system, comprising:

a transmit buffer for transmitting downstream ATM cells to the end user system via said ATM switching system;

a receive buffer for receiving upstream ATM cells from the end user system via said ATM switching system;

a processor for receiving a request message from said end user system when the wireless link is likely to become unavailable and determining a second communication link via said second base station to said end user system;

an address memory; and a controller for (a) holding the downstream ATM cells in the transmit buffer in response to an end-of-stream OAM (operations, administration and maintenance) cell from the end user system, (b) determining the location of one of the downstream cells within the transmit buffer which is to be transmitted first when transmission of downstream cells is resumed, (c) storing an address pointer indicating the location of said one downstream cell into the address memory, (d) controlling the ATM switching system to establish said second communication link, and (e) resuming transmission of downstream ATM cells via the second communication link, starting with a location of the transmit buffer specified by the address pointer in the address memory.

18. The network apparatus of claim 17, wherein said end-of-stream OAM cell contains identification of the end user system, further comprising a mapping table for mapping said identification to a group of virtual channel identifiers belonging to a virtual path identifier, wherein said controller is arranged to respond to said end-of-stream OAM cell for determining said virtual channel identifiers and holding said downstream ATM cells in said transmit buffer identified by the determined virtual channel identifiers.

19. The network apparatus of claim 17, further comprising a cell-flow synchroniser for establishing cell-flow synchronism with said end user system over said second communication link.

20. The network apparatus of claim 19, further comprising an interface for interfacing to a layer-3 signaling processor, wherein said cell-flow synchroniser is associated with said layer-3 signaling processor via said interface for establishing said cell-flow synchronism.

21. The communications network of claim 17, wherein said end user system comprises:

an interface for selectively establishing a wireless link to one of said first and second base stations;

a user transmit buffer for transmitting said upstream ATM cells to the network apparatus via the interface;

a user receive buffer for receiving said downstream ATM cells from said mobile switching center;

monitor circuitry for monitoring the wireless link to said first base station and transmitting said request message to said mobile switching center for informing that the end user system is establishing a new wireless link to the second base station when the monitored wireless link is likely to become unavailable;

a user address memory; and a controller for (a) holding the upstream ATM cells in said user transmit buffer immediately following the transmission of said request message, (b) determining the location of one of the upstream cells within said user transmit buffer which is to be transmitted first when transmission of upstream cells is resumed, (c) storing an address pointer indicating said location of said one upstream cell in said user address memory, (d) transmitting an end-of-stream OAM cell to the mobile switching center before said new wireless link is established, causing said interface establish said new wireless link, and (e) resuming transmission of upstream ATM cells when said new wireless link is established, starting with a location of said transmit buffer specified by the address pointer in said first address memory.

22. The communications network of claim 21, wherein said mobile switching center comprises a crossover switch connected to said ATM switching system.

* * * * *